United States Patent [19]

Dumont

[11] 4,125,919

[45] Nov. 21, 1978

[54] CABLE CLAMP

[76] Inventor: Eston A. Dumont, Rte. 1, Box 142, Glide, Oreg. 97443

[21] Appl. No.: 780,751

[22] Filed: Mar. 24, 1977

[51] Int. Cl.[2] .............................................. F16G 11/04

[52] U.S. Cl. ................................ 24/136 R; 24/115 M; 212/94; 403/369; 403/374

[58] Field of Search ......... 24/265 D, 263 CA, 136 R, 24/115 M, 25; 212/94, 110; 188/137, 42; 403/366, 369, 374

[56] References Cited

U.S. PATENT DOCUMENTS

| | | | |
|---|---|---|---|
| 179,936 | 7/1876 | Bowen | 403/369 |
| 525,775 | 9/1894 | Wainwright | 403/369 |
| 875,121 | 12/1907 | Shryock | 24/136 |
| 1,150,870 | 8/1915 | Lincoln | 24/263 D |
| 1,187,726 | 6/1916 | Good | 24/136 R |
| 1,458,906 | 6/1923 | Morisette | 24/136 R |
| 2,765,140 | 10/1956 | Gerlach | 403/374 |
| 3,247,933 | 4/1966 | Hanna | 212/122 |
| 3,844,419 | 10/1974 | Holmes | 212/122 |

*Primary Examiner*—Bernard A. Gelak

[57] ABSTRACT

A cable clamp includes a box-like housing with opposite sidewalls, an open top and opposite end openings. A clamping mechanism within the housing includes a pair of laterally and longitudinally movable, laterally spaced inner clamping blocks with replaceable wear plates on their inner faces defining a cable passage therebetween so that a cable can pass freely longitudinally through the housing. A pair of outer wedging blocks back up the inner blocks and are laterally but not longitudinally movable within the housing. The outer blocks are spaced inwardly from the sidewalls of the housing to define wedging spaces. Longitudinally double-tapered outer faces of the inner blocks mate with complementary inner faces of the outer blocks. The outer faces of the outer blocks are vertically tapered to receive correspondingly tapered wedging surfaces of activating wedges movable vertically within the wedging spaces to drive the outer and inner blocks laterally toward the cable, causing the wear plates to grip it. Thereafter, external forces tending to cause relative movement between the clamp and cable activate a longitudinal wedging action induced by the double-tapered mating surfaces of the inner and outer blocks, increasing the clamping force on the cable with increases in such external forces. Upon withdrawal of the activating wedges from the wedging spaces, a spring-operated clamp release retracts the inner blocks from the cable and a spring-operated centering mechanism returns the inner blocks to longitudinally neutral positions within the housing.

19 Claims, 14 Drawing Figures

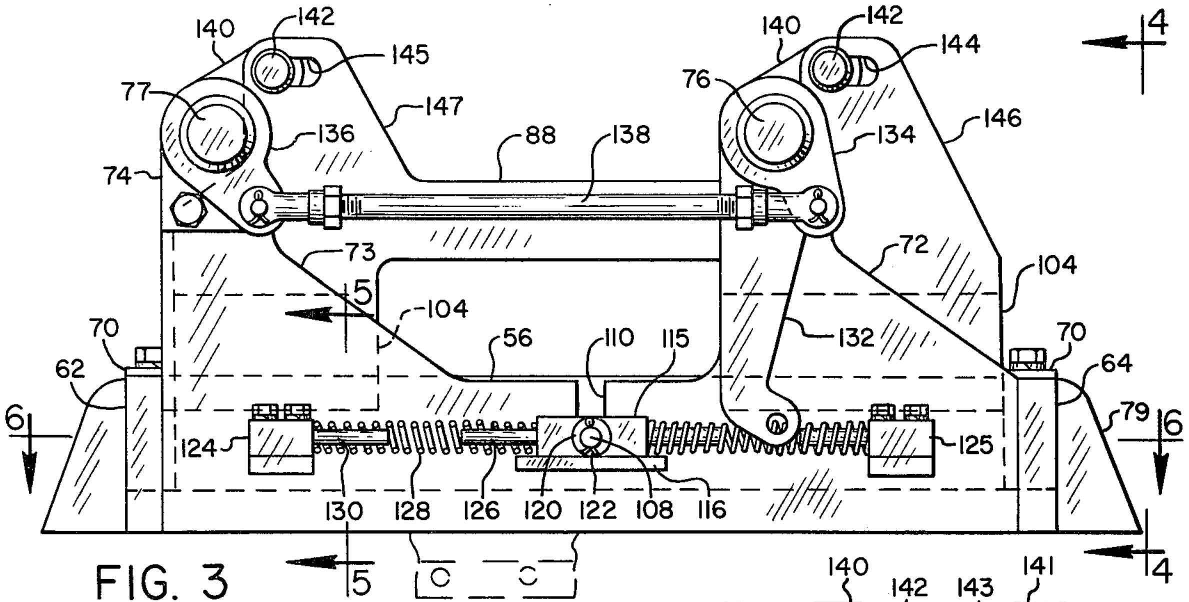
FIG. 3
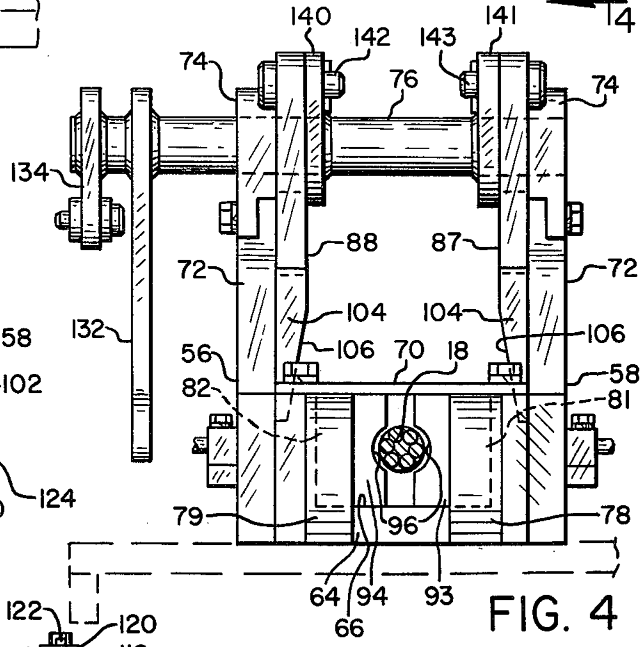
FIG. 4
FIG. 5
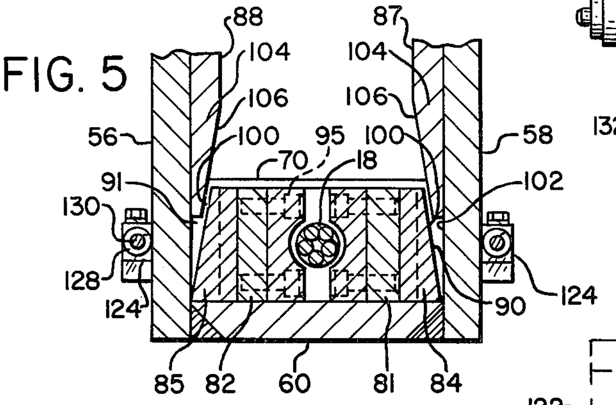
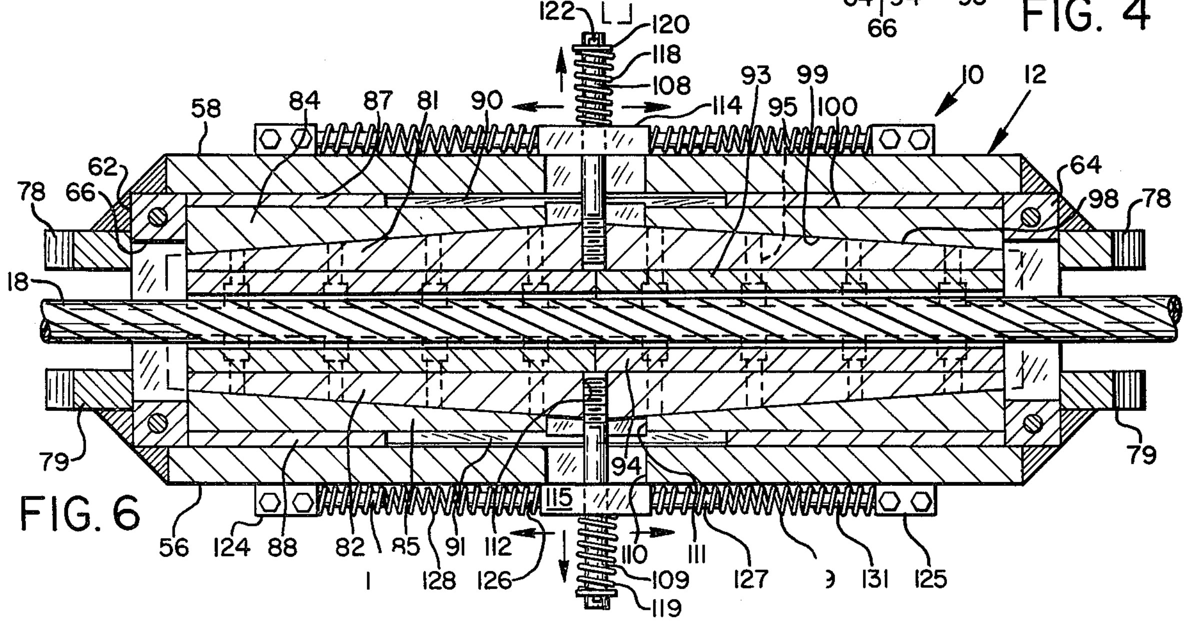
FIG. 6

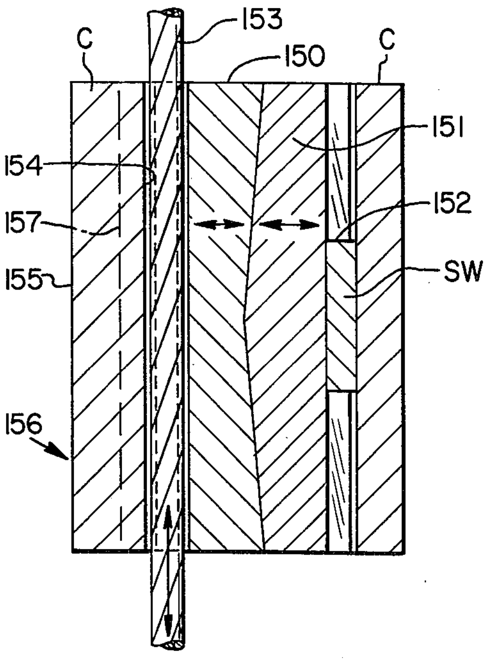
FIG. 7
FIG. 7A
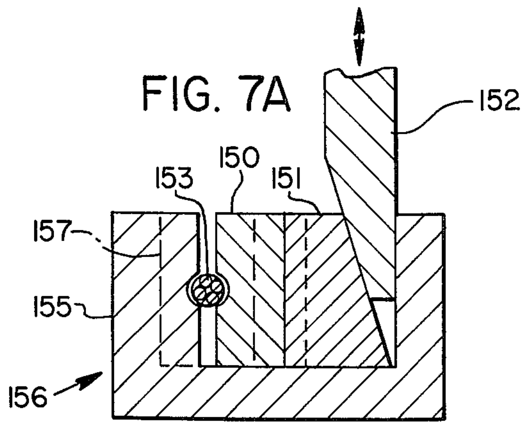
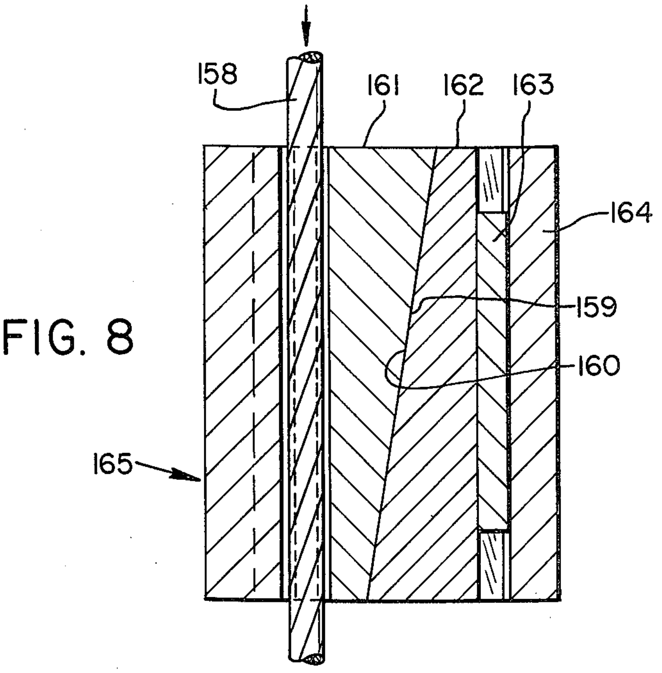
FIG. 8
FIG. 9
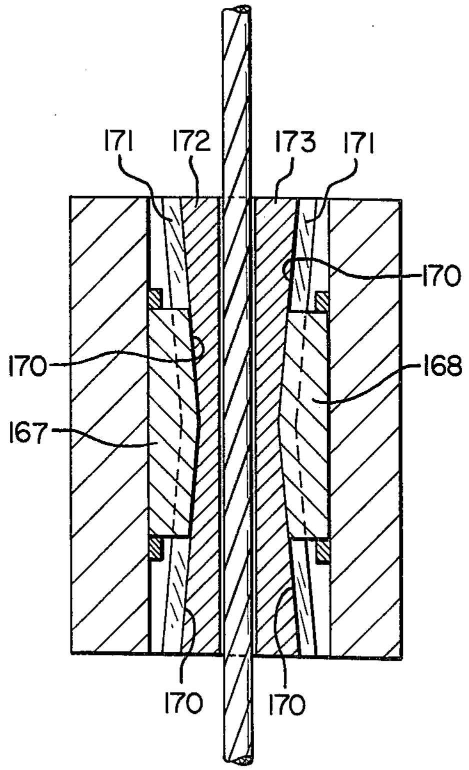
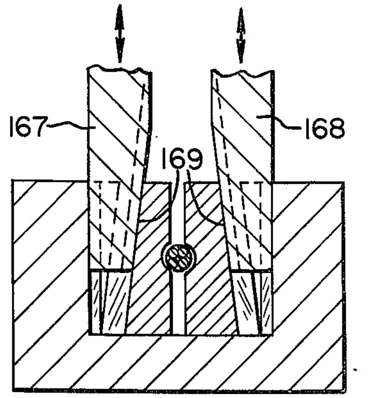
FIG. 9A

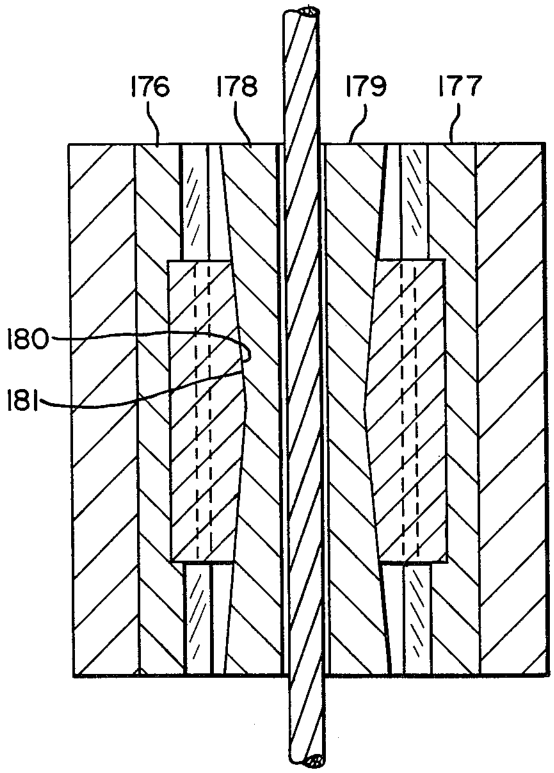
FIG. 10
FIG. 10A
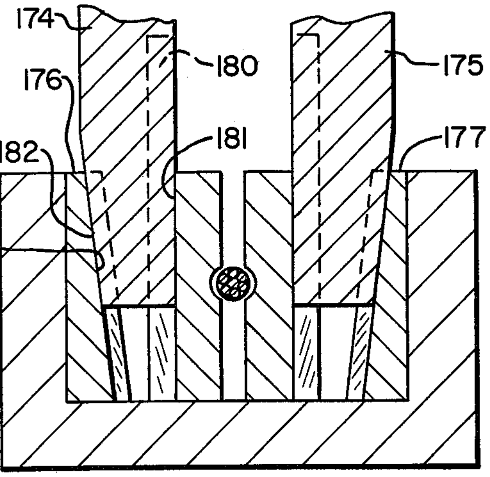
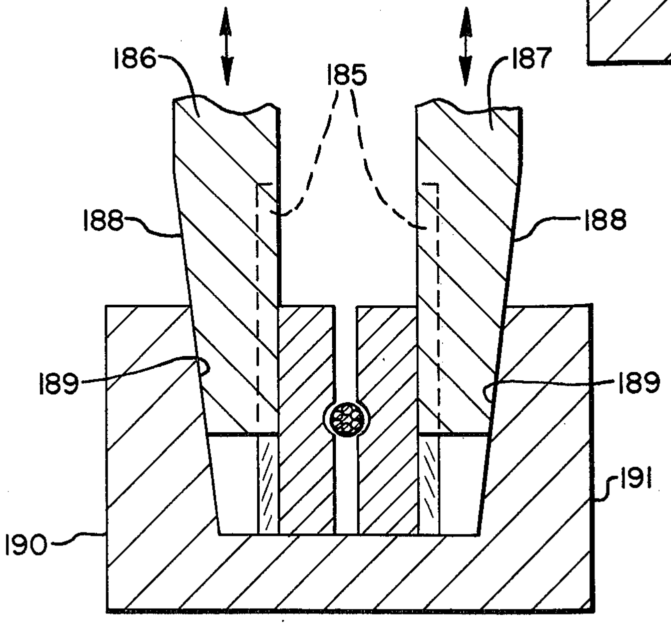
FIG. 11

CABLE CLAMP

BACKGROUND OF THE INVENTION

1. Field of the Invention

The present invention relates to a cable clamp and more particularly to a wedge-operated cable clamp for clamping an object to a running cable or alternatively for clamping a traveling carriage or other object to a fixed cable.

2. Description of the Prior Art

One method of logging involves the use of a so-called "skyline carriage" moving along a fixed, suspended skyline cable to skid or carry logs from the woods to a log collection point or "landing". There the logs are loaded onto trucks and transported to a lumber or plywood mill for processing. The skyline carriage is equipped with a cable clamp to hold the carriage in a desired position on its skyline when not traveling along it, such as when logs are being attached to the carriage in the woods or unloaded from the carriage at the landing.

Known cable clamps, including those for skyline carriages, apply a clamping force to the cable which is directly porportional to an external primary force applied to the clamping members by a power device such as a fluid cylinder. If the primary force generated by the power device is insufficient to prevent slippage of the clamp and cable relative to one another because of the load on the carriage or other traveling object mounting the clamp in the case of a fixed line, or because of the tension on the running cable where the clamp is mounted on a stationary object, the slippage cannot be arrested. In the case of skyline carriages, slippage of the cable clamp makes loading and unloading operations difficult and endangers the lives of persons working below the carriage.

Cable clamps for skyline carriages representative of the prior art are shown in U.S. Pat. No. 3,863,774, 3,718,262; and 2,330,736. The cable clamps shown in these three patents all use the same basic principle; a primary force generated by a spring or cable tension applies a clamping force through a system of interconnected levers and linkages to a movable clamping member to force the movable clamping member toward a fixed clamping member to clamp a cable therebetween. Because of the system of interconnected linkages used, once a cable starts to slip between the clamping members, no greater clamping force is inherently generated. Only an increase in the applied primary force, if any increase is available, will increase the gripping force on the cable to stop the slippage.

Perhaps the closest prior art is represented by the Goepel U.S. Pat. No. 1,201,169 showing a different type of cable grip or clamp, the clamping force of which is directly proportioned to the tension in a cable or chain induced by an attached load to be carried. The clamp has a fixed clamping member on one side of the cable and a wedge-shaped movable clamping member on the opposite side of the cable which slides along an inclined plane to apply a clamping force to the cable. The movable clamping member is slid into gripping contact with the cable by a lever connected directly to the load cable so that the gripping force of the clamp depends directly on the tension on the load cable. Although there would be some tendency for the wedge-shaped clamping member to apply a progressive wedging force to the cable should it start to slip, such tendency occurs in only one direction of slippage and is inhibited by the tension in the load cable itself because of the direct connection between the load cable and the clamping member.

Accordingly, there is a need for an improved cable clamp which will automatically apply an increased clamping force to the cable upon increases in the tendency of the clamp and cable to slip relative to one another.

SUMMARY OF THE INVENTION

The present invention is an improved cable clamp suitable for use in clamping a movable object such as a skyline carriage to a fixed cable or alternatively for clamping any object to a running cable.

A primary feature of the cable clamp of the invention is its ability to self-energize to apply a progressively increasing clamping force to a cable automatically upon increases in forces tending to cause slippage between the cable and the clamp.

Another important feature is the ability of the clamp to self-energize to prevent slippage of the clamp in either of opposite directions along the cable.

Another primary feature is the ability of the clamp to apply its self-energizing progressive clamping force without any increase in the primary clamp-activating force.

Another feature of the clamp is its use of a series of interrelated wedging surfaces to generate the aforementioned self-energizing progressive clamping force.

Still another feature of the invention is the use of a series of interrelated but disconnected and independently movable clamping members embodying the aforementioned wedging surfaces to enable activation and application of the self-energizing progressive clamping force independently of the primary clamp-activating force.

Primary objects of the invention are to provide a cable clamp which has the foregoing features and which is simple and foolproof in operation, easy to manufacture, and easy to activate through the application of a relatively small primary activating force as applied, for example, by a small double-acting fluid cylinder.

In a preferred embodiment, a cable clamp embodying the foregoing objects and features includes a heavy rigid box-like housing for the clamping mechanism with fixed upright sidewalls between which the movable portions of the clamping mechanism are mounted. The cable extends through the housing between the sidewalls in a cable passage between a pair of opposed laterally and longitudinally movable inner clamping members operable to clamp the cable therebetween. Each inner member is backed by an outer laterally movable member. The mating faces of the inner and outer members are longitudinally double tapered so as to be complementary to one another and to provide a wedge-clamping effect upon movement of the inner members longitudinally in either direction relative to the outer members.

The outer face of each outer member is vertically tapered and spaced from a vertical inner face of the adjacent fixed housing sidewall to provide a wedging space therebetween. Clamp-activating wedge plates with vertically tapered wedging surfaces complementary to the tapered vertical surfaces of the outer members are movable vertically within the wedging spaces in sliding engagement with the outer members and fixed sidewalls. When driven into the wedging spaces, the activating wedges generate a clamp-activating force which shifts the outer and inner members laterally toward the cable to cause the inner members to grip the cable. When the cable is gripped, any tendency of the cable and clamp to move longitudinally relative to one another shifts the inner members longitudinally relative to the outer members over their mating double-tapered faces, generating a progressive clamping force which increases with increases in the tendency of the cable and clamp to slip.

The activating wedges are moved in opposite directions within the wedging spaces by a double-acting fluid cylinder through a mechanical linkage system. Spring-operated means withdraw the inner members from engagement with the cable and return such members longitudinally to their centered or neutral positions within the housing upon withdrawl of the activating wedges from their wedging spaces.

The foregoing objects, features and advantages of the present invention will become more apparent from the following detailed description which proceeds with reference to the accompanying drawings.

BRIEF DESCRIPTION OF THE DRAWINGS

In the drawings:

FIG. 3 is a side view of the cable clamp as viewed from line 3—3 of FIG. 2;

FIG. 4 is an end view of the cable clamp as viewed from line 4—4 of FIG. 3;

FIG. 5 is a partial vertical sectional view taken along the line 5—5 of FIG. 3;

FIG. 6 ia horizontal sectional view taken along the line 6—6 of FIG. 3;

FIGS. 7 and 7A are horizontal and vertical schematic diagrams, respectively, of a first modified form of the invention;

FIG. 8 is a horizontal schematic diagram of a second modified form of the invention;

FIGS. 9 and 9A are horizontal and vertical schematic diagrams, respectively, of a third modified form of the invention;

FIGS. 10 and 10A are horizontal and vertical schematic diagrams, respectively, of a fourth modified form of the inventions; and FIG. 11 is a vertical schematic diagram of a fifth modification.

DETAILED DESCRIPTION OF A PREFERRED EMBODIMENT

Typical Logging Carriage Application of Clamp

Figure 1:
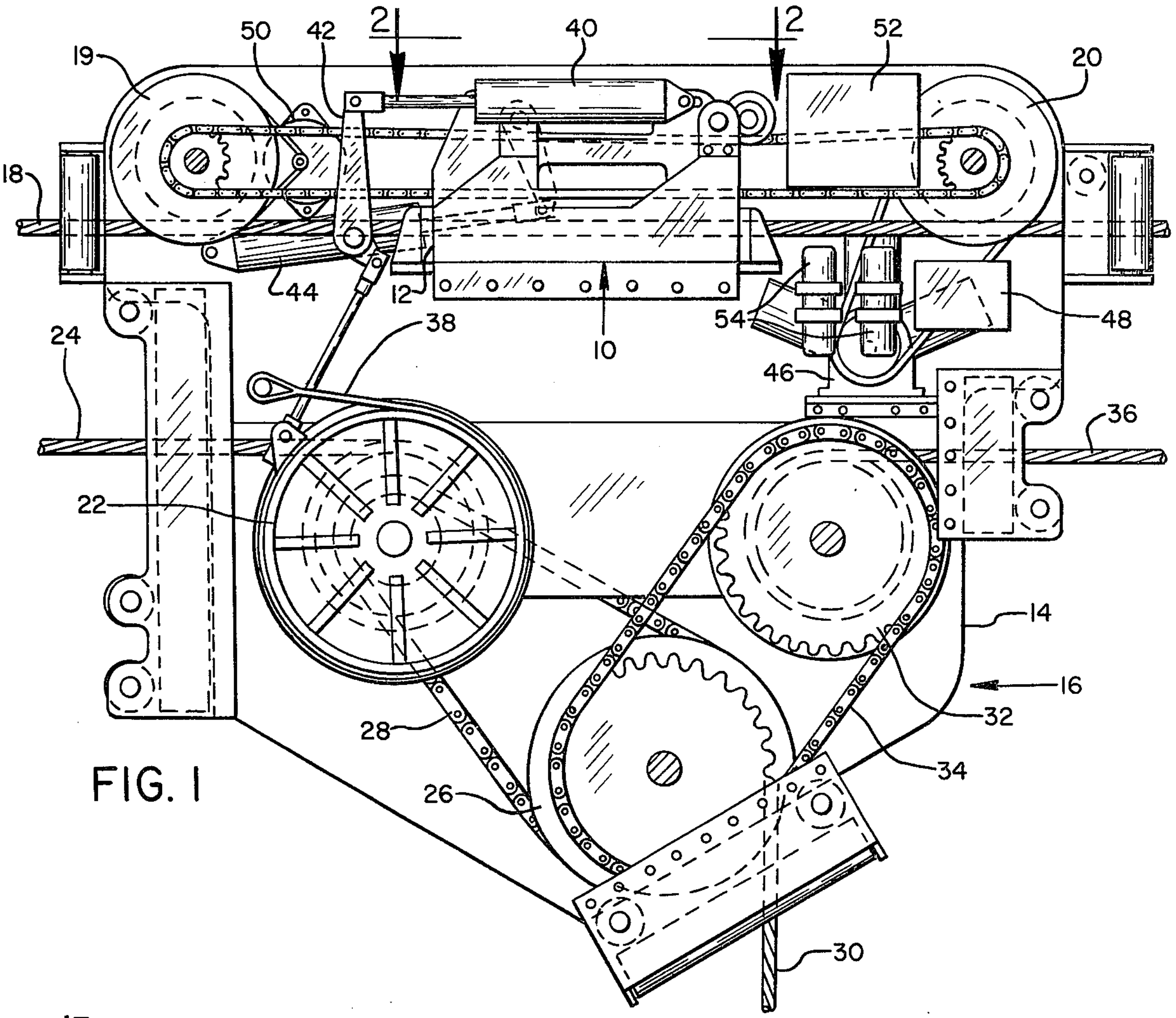
FIG. 1 is a side view of a skyline carriage with one side plate removed and mounting a cable clamp of the invention.

With reference to the drawings, in FIG. 1 a cable clamp 10 of the invention includes a rigid box-like housing 12 providing a containment means for internal clamping mechanism. Such housing is mounted rigidly between the opposite side plates 14 of a skyline logging carriage 16. The carriage is suspended from a fixed skyline cable 18 by sheaves 19, 20 for travel along cable 18.

The carriage has an in-haul cable drum 22 which stores a portion of an in-haul cable 24 extending to a power-operated yarding winch drum (not shown) at the log landing. Carriage drum 22 is interconnected with a second, drop line drum 26 by an endless roller chain 28. Drop line drum 26 stores a drop line cable 30 which is used to connect logs or other loads to and suspend them from the carriage. A third, haulback drum 32 on the carriage is interconnected with drop line drum 26 by an endless roller chain 34 and stores a haulback cable 36. Haulback cable 36 typically extends to and about rigging blocks anchored to trees or stumps in the woods and then back to a second powered yarding winch drum (not shown) at the landing.

In-haul drum 22 has a band brake 38 to selectively prevent its rotation. The brake is operated by an air cylinder 40 through a mechanical linkage system 42. With brake 38 applied, all three carriage drums are prevented from rotating. Under such circumstances, with tension applied to in-haul cable 24 and haulback cable 36 slacked, the inhaul cable pulls the skyline carriage along skyline 18 toward the landing for unloading. Conversely, with brake 38 applied, inhaul cable 24 slack, and haulback cable 36 tensioned, the haulback cable pulls the carriage along the skyline back to the woods to pick up another load of logs.

After the carriage is stopped at a desired location along skyline 18, drum brake 38 is released and cable clamp 10 is applied to clamp the carriage to the skyline. With brake 38 released, cables 24 and 36 can be used, by tensioning one and slackening the other, to rotate the carriage drums, including drop line drum 26, in opposite directions to raise or lower drop line 30 to the ground for attaching, lifting or releasing a load.

The carriage has its own power source for operating air cylinder 40 and a second air cylinder 44 for activating cable clamp 10. This power source includes an air compressor 46 operated by rotation of carriage sheave 20 as it moves along the skyline to fill an accumulator tank (not shown) on the carriage. An alternator 50 on the carriage is used for recharging an electrical storage battery 48, which is used to power a radio receiver 52. The radio receiver is used to operate air valves 54 which control operation of the air cylinders for drum brake 38 and cable clamp 10. Thus operation of the brake and clamp is remotely controlled by radio transmitter from the ground.

The foregoing describes a typical application of the cable clamp of the invention. However, it is to be understood that the cable clamp can be used in any other application where there is a need to clamp a moving object to a fixed cable or alternatively any object to a running cable.

CABLE CLAMP HOUSING

Referring now to FIGS. 2–6, the sturdy box-like housing or containment means 12 of cable clamp 10 is preferably made of heavy rigid steel plates joined together as by weldments. It includes basically a pair of upstanding opposite sidewalls or plates 56, 58 joined by a bottom wall or plate 60. U-shaped opposite end plates 62, 64 extend between the ends of the opposite side-plates 56, 58. The U shape provides opposite end openings 66 which permit a cable 68 to pass longitudinally through the housing between the opposite sideplates. Thin end cover plates 70 cap end openings 66 and are fastened to the upper ends of end plates 62, 64 to prevent upward movement of movable clamping members from within the housing.

Referring to FIGS. 3 and 4, each opposite side plate 56, 58 includes upward side plate extensions 72, 73, to the upper ends of wich are attached side plate ears 74 for rotatably mounting a pair of transverse clamp-activating shafts 76, 77 extending between opposite side plates 56, 58. A pair of end extension ears 78, 79 extend endwise from each of the opposite end plates 62, 64 to serve as wedge stops to limit endwise movement of inner wedge-clamping members, to be described, within the housing. The upright portions of end plates 62, 64 also function as end stops for outer wedging members, to be described, within clamp housing 12.

CABLE-CLAMPING MECHANISM

Figure 2:
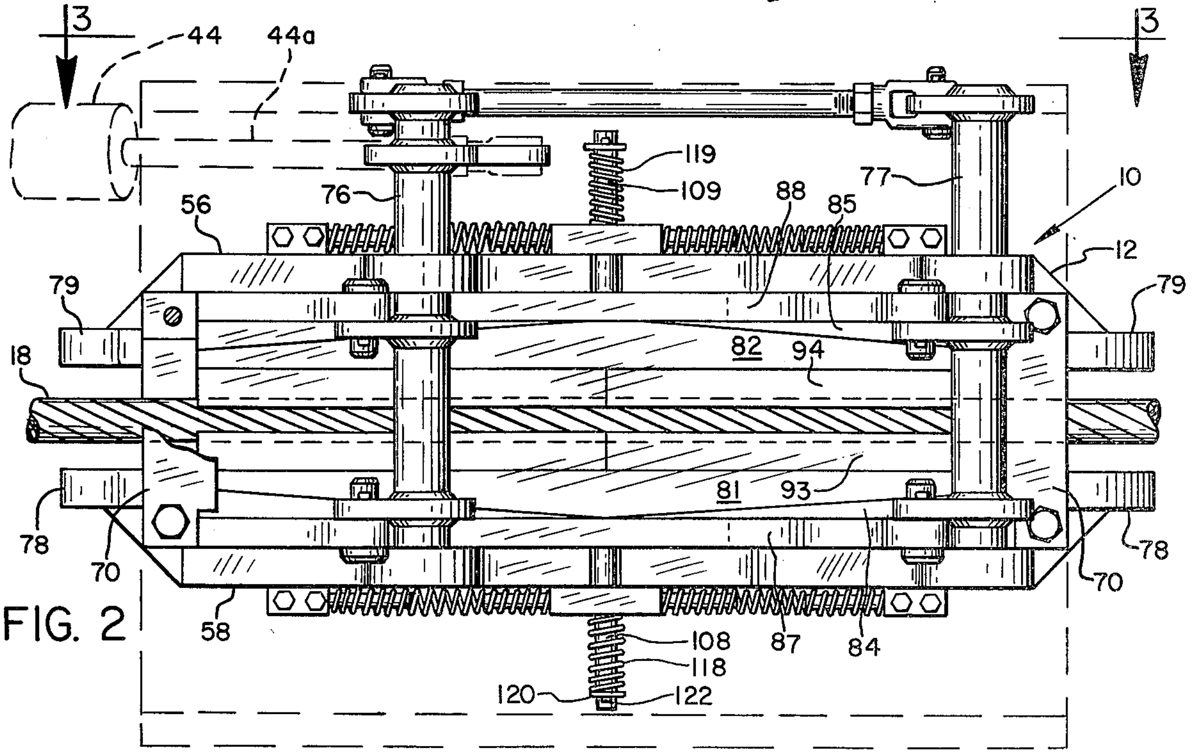
FIG. 2 is an enlarged plan view of the cable clamp of FIG. 1 shown removed from the skyline carriage.

The cable-clamping mechanism itself, best shown in FIGS. 5 and 6, but also shown to some extent in FIGS. 2, 3 and 4, is housed within the box-like containment means or housing just described, between sideplates 56, 58. Such mechanism includes basically three pairs of movable wedge-clamping elements, one of each pair being on each of the opposite sides of the skyline cable 18 which passes centrally through the housing. Such pairs of elements include a pair of opposed laterally and longitudinally movable inner clamping members or blocks 81, 82, a pair of outer laterally movable wedging members or blocks 84, 85 backing up and in mating engagement with inner clamping members 81, 82, and a pair of activating wedge means comprising plates 87, 88 movable vertically within confined wedging spaces 90, 91 between outer movable blocks 84, 85 and fixed housing side plates 56, 58.

The two opposed inner clamping blocks 81, 82 have replaceable wear plates 93, 94 attached to their inner faces with threaded fasteners 95. A longitudinal groove 96 is machined into the inner face of each wear plate. Each such groove has a radius of curvature equal to one-half the diameter of cable 18, but the total depth of the two grooves together is less than the diameter of cable 18. Thus when the opposed wear plates are forced toward one another they will not abut but instead will grip cable 18 within their respective grooves. Thus the grooved inner faces of the wear plate portions of the inner clamping blocks define a cable passage therebetween through which cable 18 extends in passing through the clamp housing.

The outer face 98 of each inner block 81, 82 is double-tapered longitudinally inwardly toward its opposite inner face from a midportion of the block toward its opposite ends. The inner blocks are slidable freely along the bottom plate of the housing, laterally and also longitudinally within the limits permitted by wedge stops 78, 79.

The pair of outer blocks 84, 85, although in face-to-face engagement with inner blocks 81, 82, are nevertheless independent of the inner blocks. However, the outer blocks normally move laterally with the inner blocks. The outer blocks are held against longitudinal movement by the opposite housing end plates 62, 64. The inner faces 99 of outer blocks 84, 85 are longitudinally double-tapered to be complementary to and normally mate with the outer faces of the inner blocks. Outer faces 100 of the outer movable blocks 84, 85 are longitudinally straight but vertically tapered from top to bottom in the manner shown in FIG. 5 toward their adjacent side plates 56, 58. Outer faces 100 are also spaced from the vertical inner faces 102 of side plates 56, 58 to define the confined wedging spaces 90, 91.

Activating wedge plates 87, 88 each include a pair of downwardly extending sliding wedge portions 104 longitudinally spaced apart at their opposite ends. The sliding wedge portions extend down into wedging spaces 90, 91 and have vertically tapered inner wedging surfaces 106 which are complementary to the outer tapered surfaces 100 of outer blocks 84, 85 to enable sliding movement of wedging surfaces 106 along outer block surfaces 100. Thus from FIG. 5 it will be apparent that when all four sliding wedge portions 104 are driven downwardly simultaneously into wedging spaces 90, 91 and into sliding engagement with outer blocks 84, 85, a lateral wedging force is applied to the outer blocks, moving them and their mating inner blocks 81, 82 laterally toward cable 18, causing the wear plates 93, 94 to grip the cable. Thereafter, any axial movement of cable 18 relative to the clamp assembly causes the inner blocks to slip with the cable longitudinally relative to the outer blocks, whereby the mating double-tapered surfaces of the inner and outer blocks become energized to apply a progressively increasing wedge-clamping force to the cable. This self-energizing action of the inner and outer blocks occurs to increase the clamping force on the cable without any increase in externally applied activating forces to activating wedges 104.

The vertical taper of the activating wedge surfaces and outer blocks must be carefully selected, because if the wedge angle is too small, the activating wedges will be difficult or impossible to remove from their wedging spaces and the clamp will not be released. However, if the wedge angle is too great, the primary activating force available will be insufficient to activate the clamp.

The longitudinal taper of the inner and outer blocks must also be carefully selected. If the taper angle is too small, the inner members are likely to slide longitudinally against wedge stops 78, 79 before sufficient wedging force is exerted to hold the cable against slippage. On the other hand, if the longitudinal taper is too great, the cable will slip relative to the inner blocks before the inner blocks slip along the outer blocks to energize the progressive longitudinal wedge-clamping action.

In the illustrated embodiment, the angle of longitudinal tapet is about 5 degrees or less and the vertical taper is about 10 degrees or less. However, these angles will vary somewhat depending on the coefficient of friction of the materials used for the wedging surfaces of the inner and outer blocks and activating wedges, and the gripping surfaces of the wear plates and on the amount of power available to insert and withdraw the activating wedges. In the preferred embodiment, the double-tapered inner faces of the outer blocks are faced with brass to reduce the sliding friction between the inner and outer blocks. The outer and inner blocks themselves, including the wear plates, are mild steel, although no doubt other suitable materials could be used.

CLAMP RELEASE AND CENTERING MEANS

Spring-operated clamp release and centering means are provided for retracting the inner blocks from engagement with cable 18 and shifting them longitudinally to centered, neutral positions when the activating wedges 104 are withdrawn from wedging engagement with the outer blocks. Such means are spring-operated and shown best in FIGS. 3, 5 and 6.

The clamp release means includes a pair of transverse spring rods 108, 109 extending through inverted T-shaped slots 110, 111 in the opposite side plates and opposite outer blocks, respectively. The rods are threaded at their inner ends into holes 112 in the centers of inner blocks 81, 82 to firmly connect the rods to the inner blocks. The rods also extend through spring carriage blocks 114, 115 mounted for longitudinal sliding movement along the outer faces of housing side plates 56, 58 over the horizontal portions of slots 110 and along slide plates 116 welded to the outside faces of the side plates as shown in FIG. 3. Compression springs 118, 119 surrounding the rods are compressed between spring carriage blocks 114, 115 and washers 120 held in place by cotter pins 122 near the outer ends of the rods. Thus springs 118, 119 bias the inner blocks 81, 82 away from cable 18 when the clamp is not activated by wedge plates 87, 88.

The clamp-centering means includes the previously mentioned spring carriage blocks 114, 115 and a pair of spring holder blocks 124, 125 fixed to the outer face of each side plate in longitudinal alignment with and on opposite sides of the spring carriage blocks. A pair of spring retention pins 126, 127 project horizontally from opposite sides of each carriage block to retain the innermost end portions of a pair of longitudinally extending compression springs 128, 129 normal to the clamp release spring 119. Similar spring retention pins 130 project horizontally from each spring holder block 124, 125 toward and in alignment with spring carriage pins 126, 127 to retain the opposite end portions of compression springs 128, 129. Opposing compression springs 128, 129 along the opposite side plates thus act against longitudinally slidable carriage blocks 114, 115 to bias them and therefore their connected inner blocks 81, 82 to spring-centered neutral positions. The inner blocks therefore return from longitudinally offset wedge-clamping positions to their spring-centered positions whenever activating wedges 104 are withdrawn to clamp-deactivating positions.

CLAMP-ACTIVATING MEANS

The clamp-activating means includes, in addition to the two activating wedge plates 87, 88, means for driving the four wedge portions 104 of the plates vertically, or normal to the lateral directions of movement of the outer and inner wedging blocks, into and out of wedging engagement with the outer blocks within wedging spaces 90, 91. Such means includes the previously mentioned double-acting air cylinder 44 and transverse shafts 76, 77 and a lever and linkage system for transmitting the primary activating and deactivating forces from the cylinder to the shafts and from the shafts to the wedge plates.

More specifically, air cylinder 44 has its piston rod 44*a* pinned to the lower end of a lever arm 132 shown in FIGS. 3 and 4. The upper end of lever arm 132 is affixed to transverse shaft 76 outwardly of housing side plate 56. Thus reciprocation of the air cylinder 44 oscillates shaft 76 about its axis. Ears 134, 136 affixed to the outer ends of shafts 76, 77, respectively, are interconnected by a connecting rod 138 to transmit the oscillatory motion of shaft 76 to the other transverse shaft 77. A pair of crank arms 140, 141 affixed to each transverse shaft 76, 77 inwardly of wedge plates 87, 88 carry crank pins 142, 143 which interconnect the crank arms and their adjacent wedge plates 87, 88. The crank pins ride in generally horizontal slots 144, 145 in upward extensions 146, 147 of the opposite ends of each wedge plate.

OPERATION

The clamp assembly is shown in its activated, clamping condition in FIG. 2 and in its inactive condition in FIGS. 3–6. To activate the clamp requires an extension of cylinder 44. Such extension pivots lever arm 132 clockwise in FIG. 3, rotating interconnected shafts 76, 77 clockwise also to rotate crank arms 140, 141 downwardly. Downward driving forces are thus transmitted through the four crank pins 142, 143 to the opposite ends of both wedge plates 87, 88 driving the four wedging blades 104 of such plates downwardly within wedging spaces 90, 91 into wedging engagement with outer wedging blocks 84, 85. This downward wedging action shifts the outer and inner blocks 81, 82, 84, 85 inwardly until wear plates 93, 94 grip cable 18. When this occurs and there are forces tending to move the cable and clamp relative to one another, the inner blocks are carried longitudinally a short distance with the cable while the outer blocks remain stationary, causing longitudinal slippage between the inner and outer blocks along their mating double-tapered surfaces to initiate the self-energizing progressive wedge-clamping action of the inner blocks against the cable. The greater the forces tending to move the cable and clamp relative to one another in either direction along the cable, the greater the wedge-clamping force on the cable. Most importantly, however, the progressive increase in clamping force is entirely dependent on the cable slippage-inducing forces and independent of the primary activating force applied by the cylinder to the activating wedges.

To deactivate the clamp, cylinder 44 is retracted, pivoting lever arm 132 counterclockwise in FIG. 3 to withdraw the four wedging blades of the two wedge plates upwardly within wedging spaces 90, 91 from wedging engagement with the outer blocks. This relieves the clamping force of the inner blocks on the cable to deactivate the self-energizing clamping action of the clamp.

Although imperceptible from the drawings, all four crank pins 142, 143 make simultaneous contact with the bottoms of their respective slots 144, 145 in the wedge plates on the downstroke of crank arms 140, 141, thereby driving all four wedging blades 104 downwardly in their wedging spaces together. However, the upper limits of the four pin slots 144, 145 differ from one another by a slight amount, for example about $\frac{1}{8}$ inch. Therefore on the upstroke of the four crank arms 140, 141, each of the four crank pins contacts the upper limit of its respective wedge plate slot at a different time, thereby having an impact effect to free the four wedging blades one at a time, whereby the full force of the air cylinder and mechanical advantage of the lever and linkage system is utilized to free each wedge blade. This feature ensures that the wedging blades will not become jammed in the wedging spaces to prevent release of the clamp.

MODIFICATIONS

Obviously numerous modifications of the preferred embodiment will be readily apparent from the foregoing description. For example, numerous other power-operated means could no doubt be devised for operating the activating wedges.

Obviously also, in short versions of the clamp assembly, a single wedging blade on each side of the cable might be practical.

Where only moderate clamping forces are required, a single set of inner 150 and outer 151 blocks with associated activating wedge 152 on only one side of the cable 153 could be used. The single inner block 150 would then force the cable 153 against an opposite stationary clamping surface 154, which could be one of the sidewalls 155 of housing 156, all as shown in FIGS. 7 and 7A. Alternatively, there could be a slidable, straight and untapered plate shown by dashed lines 157 between cable 153 and sidewall 155.

Referring to FIG. 8, where resistance to cable slippage is required in only one direction of relative movement between the cable 158 and clamp, the mating surfaces 159, 160 of the inner 161 and outer 162 blocks need have but a single taper longitudinally of the blocks. An activating wedge 163 has a vertically tapered face as in other embodiments, and works between outer blocks 162 and a sidewall 164 of the housing 165. Otherwise, this embodiment is similar to that of FIG. 7.

As shown in FIGS. 9 and 9A, it is possible that the outer blocks and activating wedges can be combined in single elements 167, 168. In such case the vertically movable activating wedges 167, 168 would have wedging surfaces both vertically at 169 and longitudinally at 170 tapered. Similarly, the outer faces 171 of the inner blocks 172, 173 would have both longitudinal and vertical tapers complementary to such tapers on activating wedges 167, 168.

As shown in FIGS. 10 and 10A,· the activating wedges 174, 175 can be inserted between the outer 176, 177 and inner 178, 179 blocks if desired. In such case the longitudinal taper is provided on the mating inner faces 180, 181 of the wedges and outer faces of the inner blocks 178, 179. The vertical taper is provided on the outer faces 182 of the wedges and on the inner faces 183 of the outer blocks.

As shown in FIG. 11, where the longitudinal taper is provided on the inner faces 185 of the activating wedges 186, 187 and the vertical taper on the opposite outer faces 188 of such wedges as just described, the outer blocks (not shown) can be eliminated altogether by providing a complementary vertical taper on the inside faces 189 of the housing side plates 190, 191.

Having shown and described the principles of my invention by what is presently a preferred embodiment and several possible modifictions thereof, other modifications will no doubt occur to persons skilled in the art without departing from such principles.. I claim as my invention all such modifications that embody such principles as defined by the following claims.

I claim:

1. A releasable cable clamp comprising:

a containment means having stationary opposite sidewalls and opposite end openings enabling a length of cable to pass freely longitudinally therethrough between said opposite sidewalls, a cable-clamping mechanism housed within said containment means including:

an inner movable cable-clamping member movable laterally and longitudinally between said sidewalls, including an inner face defining one side of a cable passage through said containment means and an opposite outer face tapered longitudinally relative to said inner face to define a longitudinal first wedging surface, an outer movable member positioned between said inner member and one said sidewall and restrained against longitudinal movement, said outer member having an inner face engageable with and longitudinally tapered complementarily to the outer face of said inner member to define a longitudinal second wedging surface cooperative with said first wedging surface, and clamp-activating means including a clamp-activating third wedging surface movable in opposite directions normal to the lateral directions of movement of said inner member into and out of a confined wedging space between said inner member and said one sidewall so as to generate an initial lateral cable-clamping force to move said inner member laterally into gripping engagement with a cable within said cable passage when said third wedging surface is forced into said wedging space, said first and second wedging surfaces being longitudinally slidably cooperative to generate through wedging interaction a progressively increasing lateral cable-clamping force through said inner longitudinally movable member to supplement said initial force in resisting slippage forces tending to cause relative movement between said inner member and a cable within said passage.

2. A clamp according to claim 1 wherein said means defining said third wedging surface comprises said outer movable member whereby said third wedging surface comprises one of the inner and outer faces of said outer member.

3. A clamp according to claim 1 wherein said means defining said third wedging surface comprises a slidable activating wedge member separate from said outer movable member.

4. A clamp according to claim 3 wherein said activating wedge member is slidable within a confined space located between an outer face of said outer movable member and an inner face of said one sidewall of said containment means.

5. A clamp according to claim 1 wherein there are a pair of said inner movable members, a pair of opposed said outer movable members and a pair of opposed said third wedging surfaces operable in confined wedging spaces, one each of said pairs being positioned on opposite sides of said cable passage, said third wedging surfaces being operable to move said inner members inwardly toward one another to reduce the size of said cable passage and thereby clamp a cable therebetween.

6. A clamp according to claim 1 wherein the outer face of said inner member is longitudinally double tapered toward opposite ends of said containment means and said outer member has a longitudinally double-tapered inner face complimentary to said outer face of said inner member to provide oppositely acting first and second pairs of longitudinal wedging surfaces for generating a self-energizing, progressive clamping force in both of the longitudinally opposite directions of movement of a cable within said cable passage relative to said containment means.

7. A clamp according to claim 5 wherein the outer face of each said inner member is longitudinally double-tapered and each of said outer member has a longitudinally double-tapered inner face complementary to the outer face of a corresponding said inner member to provide a self-energizing progressive clamping force in both of the longitudinally opposite directions of movement of a cable within said cable passage relative to said containment means.

8. A clamp according to claim 5 wherein the outer face of one inner member of said pair of inner members is longitudinally tapered in one direction toward said cable passage and the outer face of the opposite inner member of said pair of inner members is longitudinally tapered toward said cable passage in a direction opposite the direction of taper of said one inner member, whereby one of said pair of inner members applies a progressive clamping force against a cable tending to move axially in one direction relative to said containment means and the other of said pair of inner members applies a progressive clamping force against a cable tending to move axially in the opposite direction relative to said containment means.

9. A clamp according to claim 1 including clamp release means biasing said inner member away from said cable passage for withdrawing said inner member from clamping engagement with a cable within said cable passage upon withdrawal of a wedging force applied to said inner member.

10. A clamp according to claim 6 including clamp-centering means biasing said inner member to a centered position longitudinally and operable to center said inner member longitudinally within said containment means upon withdrawal of wedging forces from within said confined wedging space.

11. A clamp according to claim 1 including end stop means for limiting longitudinal sliding movement of said inner member relative to the stationary sidewalls of said containment means upon clamping engagement of said inner member with a cable within said cable passage with said containment means and said cable tending to move longitudinally relative to one another.

12. A clamp according to claim 1 including power-operated wedge-activating means for moving said third wedging surface into said wedging space.

13. A clamp according to claim 12 wherein said wedge-activating means includes transverse shaft means journaled in said opposite stationary sidewalls of said containment means, lever means connected to said transverse shaft means for oscillating said shaft means, extensible power means for operating said lever means, and linkage means interconnecting said shaft means and said wedging means such that upon operation of said extensible power means to rotate said shaft means in one direction, said third wedging surface is driven into said confined wedging space in a direction to move said inner member laterally toward said cable passage.

14. A clamp according to claim 5 wherein said wedging means includes a pair of separate wedging plate means movable within said pair of confined wedging spaces on opposite sides of said cable passage, and wedge-activating means for moving said pair of separate wedging plate means simultaneously into said confined wedging spaces to move said inner members simultaneously inwardly toward one another to clamp a cable therebetween.

15. A clamp according to claim 7 wherein said wedging means includes a pair of separate wedging plate means within said pair of confined wedging spaces on opposite sides of said cable passage, and wedge-activating means operable to move said separate wedging plate means simultaneously in wedging directions within their respective wedging spaces, each of said pair of separate wedging plate means including a pair of longitudinally spaced wedging blade portions extending into a corresponding said wedging space adjacent to opposite ends of said containment means, said wedge-activating means including a pair of longitudinally spaced-apart shafts journaled in the opposite stationary sidewalls of said containment means, linkage means on each shaft means interconnecting each shaft means with laterally opposed wedging blade portions of the separate wedging plate means, lever means connected to one of said pair of shaft means for oscillating the connected shaft means, connecting rod means interconnecting said pair of shaft means for transmitting oscillating motion of one said shaft means to the other said shaft means in the same direction and to the same extent, and reciprocative power means operatively connected to said lever means to move all of said wedging blade portions within their respective wedging spaces in a wedging direction upon operation of said reciprocative power means in one direction.

16. A cable clamp comprising:

containment means including stationary upright sidewalls joined by a stationary bottom wall, said containment means including end openings at its longitudinal opposite ends, a pair of laterally opposed and spaced-apart inner movable clamping members extending longitudinally of and movable laterally between said stationary sidewalls, said inner clamping members including inwardly opposed inner clamping faces defining a cable passage extending longitudinally through said containment means from end to end thereof between said opposite sidewalls, said inner clamping faces paralleling inner faces of said sidewalls, said inner clamping members including outer faces opposite said inner clamping faces, the outer face of each inner clamping member being longitudinally double-tapered.

a pair of longitudinally extending outer movable members on opposite sides of said cable passage between said stationary sidewalls and said inner members, each outer member including a double-tapered inner face complementary to and in engagement with the double-tapered outer face of a corresponding said inner member, each said outer member having an outer face tapered in a direction toward said bottom wall to define one side of a confined wedging space between said outer member and one said sidewall, said one sidewall having an inner face defining the opposite side of said wedging space, and a pair of sliding wedge members movable in planes normal to the lateral directions of movement of said inner members, one within each of said wedging spaces, each said sliding wedge member including a tapered wedging face complementary to the tapered outer face of the adjacent said outer member for slidable wedging engagement therewith, each of said sliding wedge members including an opposite vertical outer face for slidable engagement with the inner face of the adjacent said stationary sidewall, and wedge-activating means operable to move said sliding wedge members in opposite directions within their corresponding said wedging spaces into and out of wedging engagement with said outer members thereby to generate inwardly directed lateral wedging forces to move said pairs of opposed outer and inner members simultaneously inwardly toward one another, thereby to clamp a cable within said cable passage between said inner members.

17. A clamp according to claim 16 including spring-operated clamp release means operable upon withdrawal of said sliding wedge members from wedging engagement with said outer members to force said inner clamping members away from a cable within said cable passage.

18. A clamp according to claim 17 including spring-operated clamp-centering means operable upon release of said inner clamping members from clamping engagement with a cable within said cable passage to center said inner clamping members longitudinally between the opposite ends of said containment means.

19. A clamp according to claim 18 including stop means at opposite ends of said containment means for engagement with opposite ends of said inner clamping members to limit longitudinal movement of said inner clamping members upon their clamping engagement with a cable within said cable passage tending to move relative to said containment means.

* * * * *